(12) United States Patent
Cranston et al.

(10) Patent No.: US 10,843,783 B1
(45) Date of Patent: Nov. 24, 2020

(54) HEXAKIS ICOSAHEDRON FRAME-SKIN VACUUM LIGHTER THAN AIR VEHICLE

(71) Applicant: Government of the United States, as represented by the Secretary of the Air Force, Wright-Patterson AFB, OH (US)

(72) Inventors: Brian Cranston, Dayton, OH (US); Anthony Palazotto, Dayton, OH (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 423 days.

(21) Appl. No.: 15/843,540

(22) Filed: Dec. 15, 2017

Related U.S. Application Data (60) Provisional application No. 62/440,003, filed on Dec. 29, 2016, provisional application No. 62/439,994, filed on Dec. 29, 2016.

(51) Int. Cl.
| | |
|---|---|
| *B64B 1/08* | (2006.01) |
| *B64B 1/62* | (2006.01) |
| *B64B 1/16* | (2006.01) |
| *B64B 1/12* | (2006.01) |
| *B64B 1/20* | (2006.01) |

(Continued)

(52) U.S. Cl.
CPC ............ *B64B 1/08* (2013.01); *B64B 1/16* (2013.01); *B64B 1/62* (2013.01); *B32B 27/08* (2013.01); *B32B 27/32* (2013.01); *B32B 2262/0253* (2013.01); *B32B 2605/18* (2013.01); *B64B 1/12* (2013.01); *B64B 1/20* (2013.01); *B64B 1/30* (2013.01); *B64D 27/24* (2013.01); *B64D 2211/00* (2013.01)

(58) Field of Classification Search
CPC ........ B64B 1/08; B64B 1/14; B64C 2201/022
See application file for complete search history.

(56) References Cited

U.S. PATENT DOCUMENTS

| | | | |
|---|---|---|---|
| 1,191,077 A | * | 7/1916 | Hermanson ............... B64B 1/00 244/125 |
| 1,390,745 A | | 9/1921 | Armstrong |

(Continued)

FOREIGN PATENT DOCUMENTS

WO    WO 2012025769 A1    3/2012

OTHER PUBLICATIONS

Rodriguez et al., Nonlinear Structural Analysis of an Icosahedron Under an Internal Vacuum, Apr. 29, 2015, AIAA Early Edition Article (6 Pages).

(Continued)

*Primary Examiner* — Brian M O'Hara
*Assistant Examiner* — Keith L Dixon
(74) *Attorney, Agent, or Firm* — AFMCLO/JAZ; Jeffrey Moore (57) ABSTRACT

A vacuum lighter than air vehicle (VLTAV) includes a rigid frame of rods connected together to form a hexakis icosahedron. A membrane skin covers the rigid frame and defines therewith a vessel configured to hold an internal vacuum that allows the vessel to float in the air. The plurality of rods and membrane skin have weights and dimensions that result in a neutral and/or positive buoyancy for the vessel while preventing geometric instability.

3 Claims, 6 Drawing Sheets

(51) Int. Cl.
*B64D 27/24* (2006.01)
*B32B 27/08* (2006.01)
*B32B 27/32* (2006.01)
*B64B 1/30* (2006.01)

(56) References Cited

U.S. PATENT DOCUMENTS

| | | | |
|---|---|---|---|
| 1,624,917 A | 5/1926 | Birchard | |
| 1,715,829 A * | 6/1929 | Geisler | B64B 1/00 244/125 |
| 3,282,533 A | 11/1966 | Spain | |
| 3,288,398 A | 11/1966 | Axelsson | |
| 4,113,206 A * | 9/1978 | Wheeler | B64B 1/40 244/125 |
| 4,685,640 A | 8/1987 | Warrington et al. | |
| 4,967,983 A | 11/1990 | Motts | |
| 5,285,986 A * | 2/1994 | Hagenlocher | B64B 1/60 244/125 |
| 5,645,248 A * | 7/1997 | Campbell | B64B 1/00 244/125 |
| 6,016,991 A | 1/2000 | Lowe, Jr. | |
| 6,056,240 A * | 5/2000 | Hagenlocher | B64B 1/08 244/125 |
| 6,581,873 B2 * | 6/2003 | McDermott | B64B 1/08 244/25 |
| 7,464,895 B2 | 12/2008 | Palmer | |
| 9,102,391 B2 * | 8/2015 | Brutoco | B64B 1/12 |
| 9,266,597 B1 * | 2/2016 | Pasternak | B64B 1/06 |
| 9,623,954 B2 * | 4/2017 | Kempshall | B64B 1/08 |
| 2006/0038062 A1 | 2/2006 | Akhmetelli et al. | |
| 2017/0021907 A1 * | 1/2017 | Rapport | B64B 1/08 |

OTHER PUBLICATIONS

Metlen, A Geodesic Sphere Composed of a Frame of Cylindrical, UHM, Carbon Epoxy, Pultruded Rods with a Thin Membrane Stretched Over it was Evaluated, Aug. 22, 2011-Jun. 13, 2013, AFIT Thesis (188 Pages).

Cranston, Conceptual Design, Structural Analysis, and Design Space Exploration of a Vacuum Lighter than Air Vehicle, Dec. 2012-Mar. 2016, AFIT Dissertation (254 Pages).

Metlen, Design of a Lighter than Air Vehicle that Achieves Positive Buoyancy in Air Using a Vacuum, Aug. 22, 2011-Jun. 13, 2013, AFIT Thesis (188 Pages).

Cranston et al., Design and Structural Analysis of Unique Structures Under an Internal Vacuum, Jan. 4-8, 2016, AIAA SciTech, 57th AIAA/ASCE/AHS/ASC Structures, Structural Dynamics, and Materials Conference (15 Pages).

Metlen et al., Economic Optimization of Cargo Airships, Mar. 8, 2016, CEAS Aeronautical Journal, ISSN 1869-5582 (14 Pages).

* cited by examiner

| Hexakis Icosahedron Vertex Locations ||| 
|---|---|---|
| V0 = (0.0, 0.0, C8) | V20 = (-C3, 0.0, C6) | V41 = ( C5, -C0, -C2) |
| V1 = (0.0, 0.0, -C8) | V21 = (-C3, 0.0, -C6) | V42 = (-C5, C0, C2) |
| V2 = ( C8, 0.0, 0.0) | V22 = ( C6, C3, 0.0) | V43 = (-C5, C0, -C2) |
| V3 = (-C8, 0.0, 0.0) | V23 = ( C6, -C3, 0.0) | V44 = (-C5, -C0, C2) |
| V4 = (0.0, C8, 0.0) | V24 = (-C6, C3, 0.0) | V45 = (-C5, -C0, -C2) |
| V5 = (0.0, -C8, 0.0) | V25 = (-C6, -C3, 0.0) | V46 = ( C2, C5, C0) |
| V6 = (0.0, C1, C7) | V26 = (0.0, C6, C3) | V47 = ( C2, C5, -C0) |
| V7 = (0.0, C1, -C7) | V27 = (0.0, C6, -C3) | V48 = ( C2, -C5, C0) |
| V8 = (0.0, -C1, C7) | V28 = (0.0, -C6, C3) | V49 = ( C2, -C5, -C0) |
| V9 = (0.0, -C1, -C7) | V29 = (0.0, -C6, -C3) | V50 = (-C2, C5, C0) |
| V10 = ( C7, 0.0, C1) | V30 = ( C0, C2, C5) | V51 = (-C2, C5, -C0) |
| V11 = ( C7, 0.0, -C1) | V31 = ( C0, C2, -C5) | V52 = (-C2, -C5, C0) |
| V12 = (-C7, 0.0, C1) | V32 = ( C0, -C2, C5) | V53 = (-C2, -C5, -C0) |
| V13 = (-C7, 0.0, -C1) | V33 = ( C0, -C2, -C5) | V54 = ( C4, C4, C4) |
| V14 = ( C1, C7, 0.0) | V34 = (-C0, C2, C5) | V55 = ( C4, C4, -C4) |
| V15 = ( C1, -C7, 0.0) | V35 = (-C0, C2, -C5) | V56 = ( C4, -C4, C4) |
| V16 = (-C1, C7, 0.0) | V36 = (-C0, -C2, C5) | V57 = ( C4, -C4, -C4) |
| V17 = (-C1, -C7, 0.0) | V37 = (-C0, -C2, -C5) | V58 = (-C4, C4, C4) |
| V18 = ( C3, 0.0, C6) | V38 = ( C5, C0, C2) | V59 = (-C4, C4, -C4) |
| V19 = ( C3, 0.0, -C6) | V39 = ( C5, C0, -C2) | V60 = (-C4, -C4, C4) |
| | V40 = ( C5, -C0, C2) | V61 = (-C4, -C4, -C4) |

FIG. 3

| Hexakis Icosahedron Vertex coordinate location C equations |
|---|
| $C_0 = \dfrac{r_{icos}\sqrt{5/2\,(85 - 31\sqrt{5})}}{22}$ |
| $C_1 = \dfrac{r_{icos}\sqrt{5/2\,(25 - 11\sqrt{5})}}{3}$ |
| $C_2 = \dfrac{r_{icos}\sqrt{5\,(25 - 2\sqrt{5})}}{22}$ |
| $C_3 = \dfrac{r_{icos}\sqrt{1/10\,(5 - \sqrt{5})}}{22}$ |
| $C_4 = \dfrac{r_{icos}\,5}{3\sqrt{(5 + 2\sqrt{5})}}$ |
| $C_5 = \dfrac{r_{icos}\sqrt{5/2\,(65 + 19\sqrt{5})}}{22}$ |
| $C_6 = r_{icos}\sqrt{1/10\,(5 - \sqrt{5})}$ |
| $C_7 = \dfrac{r_{icos}\sqrt{5/2\,(5 - \sqrt{5})}}{3}$ |
| $C_8 = \dfrac{r_{icos}\sqrt{5\,(25 - 2\sqrt{5})}}{11}$ |

FIG. 4

Approximate Maximized Payload or Float Capacity

| Hexakis Icosahedron Properties | | |
|---|---|---|
| Frame Specific Stiffness/Strenght | 1.29E+08 | 1.80E+06 |
| Skin Specific Stiffness/Strenght | 9.52E+07 | 1.43E+06 |
| Altitude | 0 | |
| C-ratio | 0.005 | |
| %Skin | 0.1 | |
| Frame SF | 1.019 | |
| Skin SF | 1.058 | |
| Initial W/B | 0.8 | |
| Final W/B | 0.8117 | |
| Vehicle Radius (m) | 7 | |
| Beam Thickness (mm) | 1.143 | |
| Beam Radius (mm) | 228.7 | |
| Skin Thickness (mm) | 0.2 | |
| Payload (kg) | 260.54 | |
| Float Capacity (m) | 2140 | |

FIG. 5A

Approximate Maximized Payload or Float Capacity with minimum vehicle radius

| Hexakis Icosahedron Properties | | |
|---|---|---|
| Frame Specific Stiffness/Strenght | 1.29E+08 | 1.80E+06 |
| Skin Specific Stiffness/Strenght | 9.52E+07 | 1.43E+06 |
| Altitude | 0 | |
| C-ratio | 0.005 | |
| %Skin | 0.2 | |
| Frame SF | 1.054 | |
| Skin SF | 1.507 | |
| Initial W/B | 0.91 | |
| Final W/B | 0.923 | |
| Vehicle Radius (m) | 3.1 | |
| Beam Thickness (mm) | 0.501 | |
| Beam Radius (mm) | 101.1 | |
| Skin Thickness (mm) | 0.2 | |
| Payload (kg) | 9.06 | |
| Float Capacity (m) | 860 | |

HEXAKIS ICOSAHEDRON FRAME-SKIN VACUUM LIGHTER THAN AIR VEHICLE

GOVERNMENT INTEREST

The invention described herein may be manufactured and used by or for the Government of the United States for all governmental purposes without the payment of any royalty.

CROSS REFERENCE TO RELATED APPLICATIONS

This application claims the benefit under 35 U.S.C. § 119(e) of U.S. Provisional Patent Application Serial No. 62-439994 filed on Dec. 29, 2016 and U.S. Provisional Patent Application Serial No. 62-440003 filed on Dec. 29, 2016, the entire contents of which are incorporated herein by reference.

FIELD OF THE INVENTION

The present invention relates to lighter than air vehicles, and more particularly to lighter than air vehicles using an internal vacuum and associated methods.

BACKGROUND OF THE INVENTION

The idea of a vacuum lighter than air vehicle (VLTAV) was first proposed by Francesco Lana de Terzi in 1670. His concept was simply an evacuated sphere. His idea had a flaw as the concept of buckling, which is a structural instability that comes about when you load a structure in compression, was not understood. The proposed continuous layer spheres would fail due to buckling before a complete vacuum could be created.

Another VLTAV concept is disclosed in U.S. Patent Publication No. 2006/0038062 A1 to Akhmeteli and Gavrilin who proposed to construct a skin or "shell" out of multiple layers in a sandwich configuration. The structure is composed of three layers, two thin (top and bottom) layers and a relatively thick cellular core layer. The core's material properties were low density, high compressive strength in the transverse direction, high out-of-plane shear strength, high compressive modulus in the transverse direction, and high out-of-plane shear modulus. Akhmeteli and Gavrilin verified no material existed to create a thin shelled sphere that could be placed under an internal vacuum without buckling.

In 2012, Trent Metlen at the Air Force Institute of Technology (e.g. see "Design of a Lighter than Air Vehicle that Achieves Positive Buoyancy in Air Using a Vacuum," Air Force Institute of Technology, Wright-Patterson AFB, 2013) developed the idea of using geodesic spheres covered by a membrane as the structure for a VLTAV. A geodesic sphere is an icosahedron that has its triangles divided into more triangles. When each of these divisions occur, the new vertex is place on a circumscribed sphere.

Continuing in 2014, Ruben Adorno Rodriguez again at the Air Force Institute of Technology (e.g., see "Nonlinear Structural Analysis of an Icosahedron and its Application to Lighter than Air Vehicles Under a Vacuum," Air Force Institute of Technology, Wright-Patterson AFB, 2014) modeled the icosahedron using non-linear finite elements. A goal was to determine what material properties are necessary to make an icosahedron vacuum lighter than air vehicle possible. It was determined that an important feature of a VLTAV is utilizing a material that has a high enough specific density, E/p, to withstand the compressive forces and be light enough to float.

Thus, lighter than air vehicles (LTAV) are considered vehicles that float due to filling an enclosed or semi-enclosed volume with a gas lighter than air. A vacuum may indeed be the ultimate lighter than air "gas", but it also requires the structure to be especially rigid for the reasons stated above. The problem with a vehicle of this nature is that previously no structure had been designed that can withstand the compressive loads due to an internal vacuum and still be light enough to float. It has been proposed that polyhedral shapes such as an icosahedron could be used as the structure, yet material limitations prevent the design from working today.

Therefore, there is a need for the design of frames and materials to achieve the goal of floating with an internal vacuum while withstanding the compressive loads produced thereby, and eliminating the need for a gas such as helium.

This background information is provided to reveal information believed by the applicant to be of possible relevance to the present invention. No admission is necessarily intended, nor should be construed, that any of the preceding description constitutes prior art against the present invention.

BRIEF SUMMARY OF THE INVENTION

With the above in mind, embodiments of the present invention are related to a vacuum lighter than air vehicle (VLTAV) including a rigid frame comprising a plurality of rods connected together to form a hexakis icosahedron. A membrane or membrane skin covers the rigid frame and defines therewith a vessel configured to hold an internal vacuum that allows the vessel to float in the air. The materials of the rods and membrane skin result in the vessel having a weight and buoyant force that results in positive buoyancy while preventing geometric instability.

In certain embodiments, the rods may be cylindrical, hollow and/or pultruded rods. Additionally, or alternatively, the rods may include a carbon fiber composite material having a specific modulus of at least approximately $1.29*10^8$ $m^2/s^2$ and a specific yield strength of at least approximately $1.80*10^6$ $m^2/s^2$ as a zero-degree layup.

In certain embodiments, the membrane skin may be a laminate membrane skin, such as a fiber matrix reinforced laminate membrane skin material having a specific modulus of at least approximately $9.52*10^7$ $m^2/s^2$ and specific yield strength of at least approximately $1.43*10^6$ $m^2/s^2$ for a 0.4 mm thick segment.

In certain embodiments, the rigid frame may include joint members connecting the rods at vertices. As such, the rods of the rigid frame may be connected together at 62 vertices with 180 edges defining 120 identical scalene triangle faces.

Another embodiment may be directed to a vacuum lighter than air vehicle (VLTAV) including a rigid frame of cylindrical rods connected together at 62 vertices with 180 edges defining 120 identical scalene triangle faces. A laminate membrane skin covers the rigid frame and defines therewith a vessel configured to hold an internal vacuum that allows the vessel to float in the air. The rods and membrane skin have weights and dimensions that result in a positive buoyancy for the vessel while preventing geometric instability. The cylindrical rods may include a material having a specific modulus of at least approximately $1.29*10^8$ $m^2/s^2$ and a specific yield strength of at least approximately $1.80*10^6$ $m^2/s^2$ as a zero-degree layup. The laminate membrane may be a material having a specific modulus of at least approximately $9.52*10^7$ $m^2/s^2$ and specific yield strength of at least approximately $1.43*10^6$ $m^2/s^2$ for a 0.4 mm thick segment.

In certain embodiments, the rods may be cylindrical, hollow and/or pultruded rods. Additionally, or alternatively, the rods may include a carbon fiber composite material. Also, the laminate membrane skin may be a fiber matrix reinforced laminate membrane skin.

Embodiments may be directed to a vacuum lighter than air vehicle (VLTAV) including a rigid frame of rods or a plurality of rods connected together to form a hexakis icosahedron rigid frame, and a membrane skin covering the rigid frame and defining therewith a vessel configured to hold an internal vacuum that allows the vessel to float in the air. A vacuum pump may be coupled in fluid communication with the vessel and configured to control the internal vacuum therein and create vessel up thrust. The rods and membrane skin may have weights and dimensions that result in one of a neutral buoyancy and a positive buoyancy for the vessel while preventing geometric instability.

In certain embodiments, a propulsion system may be coupled to the vessel and configured to move the vessel through the air while floating.

In certain embodiments, the rods may be cylindrical, hollow and/or pultruded rods. Additionally, or alternatively, the rods may include a carbon fiber composite material. Also, the membrane skin may be a fiber matrix reinforced laminate membrane skin.

Embodiments may be directed to a method of making a vacuum lighter than air vehicle (VLTAV), the method including constructing a rigid frame by connecting rods together to form a hexakis icosahedron, and covering the rigid frame with a membrane skin to define a vessel configured to hold an internal vacuum that allows the vessel to float in the air. The method may include selecting weights and dimensions of the rods and membrane skin to result in one of a neutral buoyancy and a positive buoyancy for the vessel while preventing geometric instability.

In certain embodiments, connecting the rods may include connecting cylindrical hollow pultruded rods at 62 vertices. The cylindrical rods may include a material having a specific modulus of at least approximately $1.29*10^8$ $m^2/s^2$ and a specific yield strength of at least approximately $1.80*10^6$ $m^2/s^2$ as a zero-degree layup. A zero-degree layup has the majority of fibers in one direction.

In certain embodiments, the membrane skin may be a fiber matrix reinforced laminate membrane skin material having a specific modulus of at least approximately $9.52*10^7$ $m^2/s^2$ and specific yield strength of at least approximately $1.43*10^6$ $m^2/s^2$ for a 0.4 mm thick segment.

A concern with vacuum airships is that the required vacuum or near-vacuum inside the structure results in the atmospheric pressure exerting enormous forces, causing the structure to collapse if not supported. The structure of the present embodiments solves the problem using geometry and materials, in combination, that resist buckling at pressures needed to produce neutral and/or positive buoyancy.

Known materials commonly used as lifting gases in lighter than air aircraft present both a cost driver and a logistics burden for those aircraft designs. An advantage of the VLTAV structure of the present embodiments is the elimination of the requirement to purchase or transport a lifting gas.

Unlike known lifting gases, a near-vacuum environment is theoretically capable of approximating the full lift potential of displaced air (e.g., such that every liter of vacuum could provide lift approaching 1.28 g). Many applications exist in aerospace and related industries for vacuum airships that exhibit such lift potential.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Known materials commonly used as lifting gases in lighter than air aircraft are expensive and burdensome. An advantage of the vacuum LTA structure of the present embodiments is the elimination of the requirement to purchase or transport a lifting gas.

A problem with the conventional concept of vacuum airships is that the required vacuum or near-vacuum inside the structure results in the atmospheric pressure exerting enormous forces, causing the structure to collapse if not supported.

Referring again to the prior art concept of the continuous layer copper sphere or shell, the way a sphere or shell of this type would not fail due to shell buckling would be if the material chosen had a specific modulus, $E/\rho^2$, of approximately $4.9*10^5$ $kg^{-1}$ $m^5$ $s^{-2}$, which did not exist in 1663. Currently, a material with a high specific stiffness, a carbon nanotube composite, has a specific stiffness value that is half of what is necessary to create a thin shell vacuum lighter than air sphere, meaning that the prior art design remains unfeasible because of limitations in the available materials. The value of $4.9*10^5$ $kg^{-1}$ $m^5$ $s^{-2}$ is computed using equation (1).

$$\frac{E}{\rho_s 2} = \frac{9 P_{cr} \sqrt{3(1-\mu^2)}}{2\rho_a^2} \quad (1)$$

Where E is equal to the modulus of elasticity (the materials resistance to being deformed elastically or linear stiffness) and $\rho_s$ is equal to the materials density. If you let $\rho_a$ be sea level air density (1.225 kg/m$^3$), $\mu$ be the Poisson's ratio (0.3), and $P_{cr}$ be sea level atmospheric pressure (101,325 Pa).

The structure of the present embodiments addresses the problem using geometry and materials, in combination, that resist buckling at pressures needed to produce neutral and/or positive buoyancy.

Referring to FIGS. 1-5, an embodiment of a vacuum lighter than air vehicle (VLTAV) 10 will be described. The VLTAV 10, such as a high-altitude balloon, for example, is configured to achieve neutral buoyancy and/or positive buoyancy using an internal vacuum.

The structure will have the ability to float. A W/B ratio, of the weight W and buoyant force B, is chosen that sets the design parameters of the structure based upon the equations discussed below. Stresses develop and then would be checked to see if the structure succeeds or fails at the desired elevation. Dimensions of the structure can be determined for a particular desired elevation. Some example materials for the rods are provided below.

Figure 1:
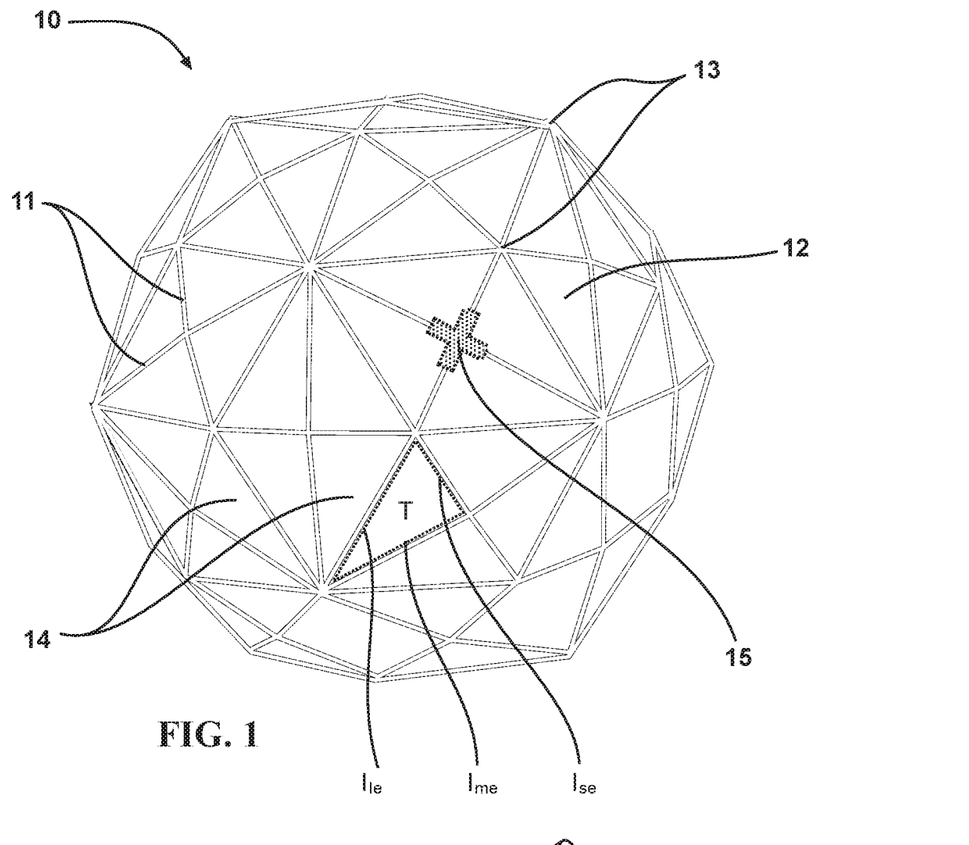
FIG. 1 is a diagram illustrating a VLTAV including a hexakis icosahedron frame and membrane skin cover according to an embodiment of the present invention.

With reference to FIG. 1, rods 11 are connected together to form a rigid frame in the shape of a hexakis icosahedron. A hexakis icosahedron is a Catalan solid with 120 faces, 180 edges, and 62 vertices. The face configuration for this shape is V4.6.10, comprising twelve vertices with four lines intersecting, twenty vertices with six lines intersecting, and thirty vertices with ten lines intersecting. This polyhedron is composed of 120 identical scalene triangles. The hexakis icosahedron is face uniform but with irregular face polygons, may also be known as a disdyakis triacontahedron, or a kisrhombic triacontahedron and would be appreciated by those skilled in the field of geometry.

Figure 2:
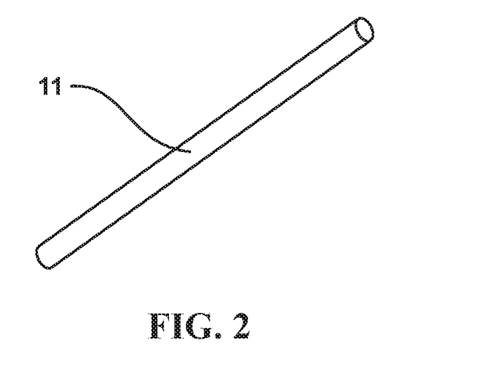
FIG. 2 is perspective view of an exemplary embodiment of a cylindrical hollow pultruded rod of the hexakis icosahedron frame of FIG. 1.

In certain embodiments, the rods 11 may be cylindrical, hollow and/or pultruded rods, for example, as illustrated in FIG. 2. Additionally, or alternatively, the rods 11 may include a carbon fiber composite material having a specific modulus of at least approximately $1.29*10^8$ m$^2$/s$^2$ and a specific yield strength of at least approximately $1.80*10^6$ m$^2$/s$^2$ as a zero-degree layup.

A membrane skin 12 is covering the rigid frame and defining therewith a vessel configured to hold an internal vacuum that allows the vessel to float in the air. In certain embodiments, the membrane skin 12 may be a laminate membrane skin, such as a fiber matrix reinforced laminate membrane skin material having a specific modulus of at least approximately $9.52*10^7$ m$^2$/s$^2$ and specific yield strength of at least approximately $1.43*10^6$ m$^2$/s$^2$ for a 0.4 mm thick segment. The laminate may be designed so that the strengthening fibers within the laminate are oriented along ideal load paths to be expected when the structure is evacuated. The manufactured membrane skin 12 would then be stretched over the frame and seams secured together (e.g. stitched or glued). Some example materials for the membrane skin 12 are provided below.

The rigid frame may include joint members 15 connecting the rods 11 at vertices 13 as shown in FIG. 1. For example, the rods 11 of the rigid frame are connected together at 62 vertices 13 with 180 edges defining 120 identical scalene triangle faces 14. It should be understood that each of the 62 vertices may include a joint member 15, for example, various vertex joint members 15 with four, six, and ten rod inserts.

Figure 3:
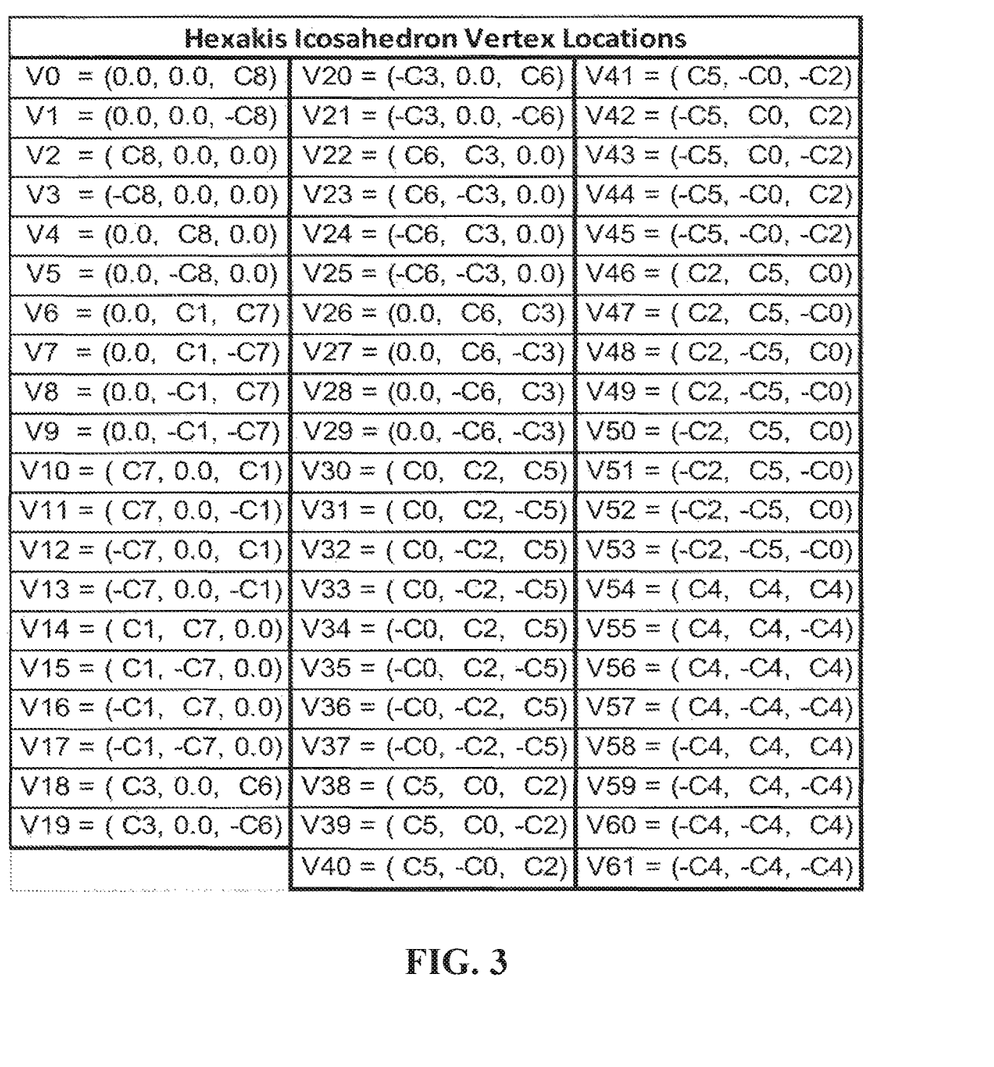
FIG. 3 is a Table presenting exemplary hexakis icosahedron vertex locations of the hexakis icosahedron frame of FIG. 1.
Figure 4:
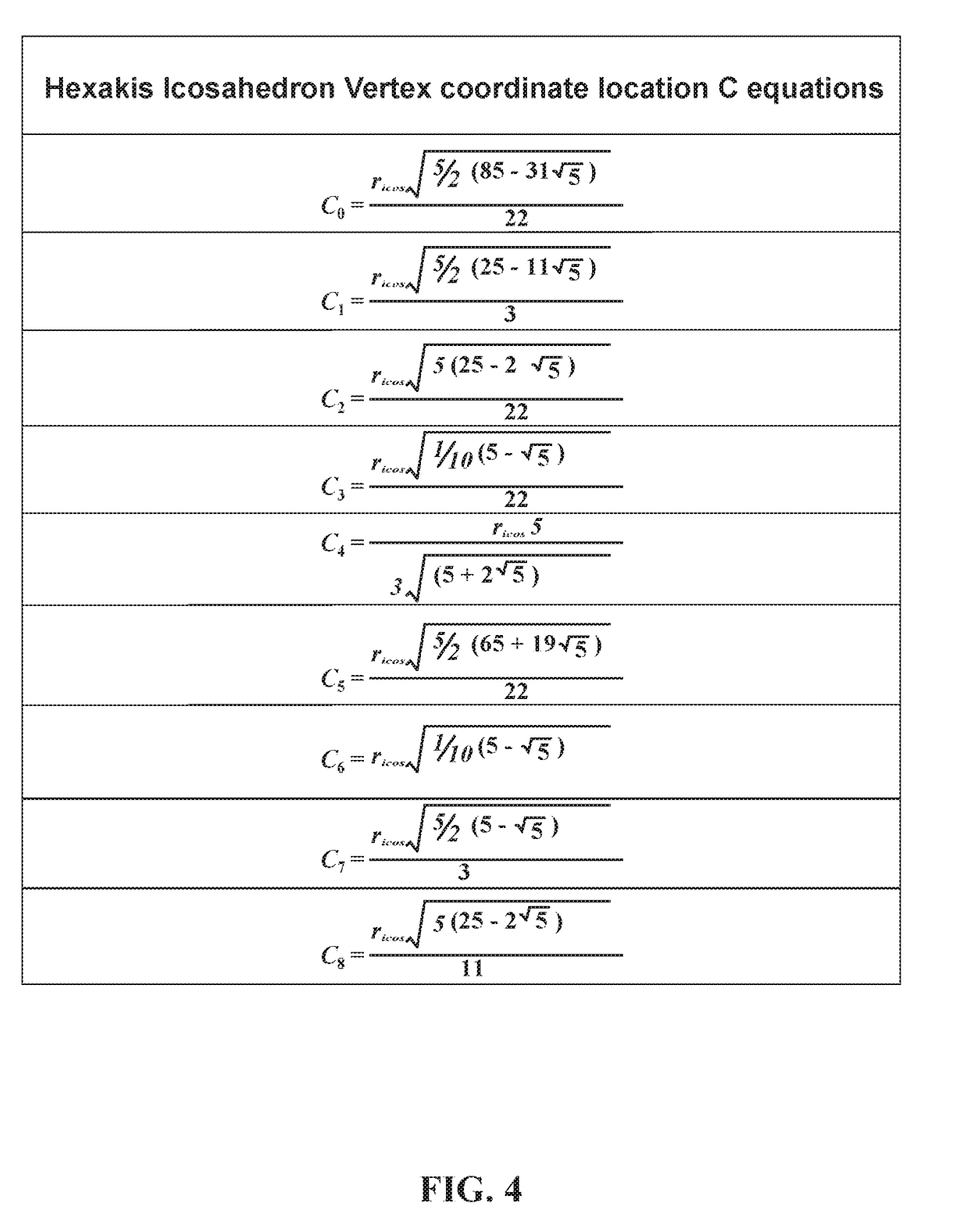
FIG. 4 is a Table presenting exemplary hexakis icosahedron coordinate equations of the hexakis icosahedron frame of FIG. 1.

The vertex locations, surface area, and volume are necessary for modeling this structure. The 62 vertex locations of the hexakis icosahedron are determined by referencing the table in FIG. 3 which includes various C values ($C_0$-$C_8$). And, a set of equations designating the C values ($C_0$-$C_8$) in FIG. 3 are shown in the table of FIG. 4 based on an inscribed icosahedron with a unit edge length in Cartesian coordinates. The inscribed icosahedron's vertices lie on the twelve vertices of the hexakis that have ten edges connecting. The C values in the table of FIG. 3 are given for the specific coordinates for each vertex locations V0-V61. There are 62 vertices and each is located in the hexakis icosahedron with three coordinates defined by the various values of $C_0$-$C_8$. The values of $C_0$-$C_8$ are defined by the equations in FIG. 4.

The edge lengths of the unit triangle T (FIG. 1) that makes up the hexakis framework can be determined by using equations (2-4) below. In which $I_{se}$, $I_{me}$, $I_{le}$ represent the short, medium, and long leg lengths of the triangle. With the edge lengths known, the surface area is computed using equation (5) as well as the number of triangles, shown in equations (5-6) below. Finally, the volume is readily computed using equation (7) below.

$$l_{se} = r_{icos} \frac{5}{11} \sqrt{49 - \frac{65\sqrt{5}}{3}} \quad (2)$$

$$l_{me} = r_{icos} \frac{1}{11} \sqrt{81 - 21\sqrt{5}} \quad (3)$$

$$l_{le} = r_{icos} 2\sqrt{7/3 - \sqrt{5}} \quad (4)$$

$$p_{ht} = \frac{l_{se} + l_{me} + l_{le}}{2} \quad (5)$$

$$A_{HI} = 120\sqrt{p_{ht}(p_{ht} - l_{se})(p_{ht} - l_{me})(p_{ht} - l_{le})} \quad (6)$$

$$V_{HI} = \frac{r_{icos}^3 100}{3\sqrt{53 + \frac{118}{\sqrt{5}}}} \quad (7)$$

To determine the frame dimensions, the independent variables that define the geometry should be computed. These variables are beam radius and thickness for the frame (e.g., hollow rods 11) and skin thickness for the skin 12. To determine these parameters, the sizing equation (8) may be used. Equation (8) is a general formula to compute the W/B for any frame-skin structure with an internal vacuum.

$$\frac{W}{B} = \frac{V_s \rho_s + V_f \rho_f + (V_i - V_r)\rho_{air,i}}{(V_i - V_r)\rho_{air,o}} \quad (8)$$

Where, $V_f$ and $V_s$ are the frame and skin volume respectively; $\rho_f$, $\rho_s$, $\rho_{air,i}$, and $\rho_{air,o}$ are the frame, skin, internal air, and external air density respectively; $V_i$ and $V_r$ are the initial internal volume and the volume lost or reduced due to the structure deforming when an internal vacuum is present. The W and B are the weight and buoyant force of the vehicle respectively.

In order to compute the frame and skin dimensions for the hexakis icosahedron VLTAV 10, the first step is to set the left-hand side (W/B) of equation (8) to an initial value. For instance, if an icosahedron design was desired to float or carry a payload, the initial value of W/B in equation (8) would be set to a number less than one (indicating a positively buoyant design). Now, for this example, just because a positively buoyant vehicle can be geometrically sized may not mean the design would actually float or carry any payload. The proposed design not only has to satisfy the W/B constraint of being less than one, it also must not fail due to material and geometric instability as well. It is noted, that the W/B value can only be less than one when the weight of the vehicle is less than the buoyant force produced. Therefore, when this is performed, any amount of weight given up for buoyancy, directly reduces the design's resistance to material and geometric instability. A W/B equal to one may not produce a VLTAV that can rise, however, it does produce a VLTAV that can float (neutrally buoyant).

The next step is to specify what percentage of the designs weight (W) is to be dedicated to the frame and skin. To do this, we introduce two variables, $$\frac{W}{B_f} \text{ and } \frac{W}{B_s},$$

frame W/B and skin W/B, where the total of these W/B's is equal to the W/B on the left-hand side of equation (8). Utilizing equation (8) and the introduction of $$\frac{W}{B_f} \text{ and } \frac{W}{B_s},$$

the beam radius and skin thickness can be computed. The equations for the beam radius and skin thickness are shown in equations (9) and (10). The beam thickness ($t_{b_{hex}}$) is computed using equation (11) by specifying the desired c value for manufacturing.

$$r_{b_{hex}} = \sqrt{\frac{\frac{W}{B_f}\rho_a V_{HI}}{((\pi 60(2c - c^2))(l_{se} + l_{me} + l_{le}))\rho_f}} \quad (9)$$

$$t_{s_{hex}} = \frac{\rho_a \frac{W}{B_s} V_{HI}}{A_{HI}\rho_s} \quad (10)$$

$$c = \frac{t_{b_{hex}}}{r_{b_{hex}}} \quad (11)$$

Again, c is the ratio of the rod thickness to the rod radius. The rods 11 or tubes are beams of the frame of FIG. 1.

The variables include: $\rho_a$ is the density of air at a given elevation; W=the weight of the system or VLTAV 10; $B_f$ is the weight of the frame; $B_s$ is the weight of the skin 12; $\rho_f$ is the density of the frame; $I_{se}$, $I_{me}$ and $I_{le}$ represent the short, medium, and long lengths of the frame members or rods 11 making up each triangle; $V_{HI}$ is the total volume of the hexakis icosahedron frame; and $A_{HI}$ is the surface area of the hexakis icosahedron frame.

One suitable material for the frame rods 11 may be a carbon fiber composite extruded into hollow tubes that meet the criteria of thickness and ratio described above. A driving constraint for the present embodiments may be the need for a frame and skin material to have a high specific modulus $$\left(\frac{E}{\rho}\right)$$

and a high specific strength $$\left(\frac{E}{\sigma_y}\right).$$

Where E is the material modulus of elasticity, $\rho$ is the material density, and $\sigma_y$ is the material yield strength. An example of a material for the frame that has been preliminarily analyzed using finite elements is IM10 or Hexply 8552. This material has a specific modulus of approximately $1.29*10^8$ m²/s² and a specific yield strength of $1.80*10^6$ m²/s² as a zero-degree layup. Of course, other materials can be used for the frame as long as they meet or exceed the specific properties of Hexply 8552.

One suitable material for the membrane skin is a laminate constructed by Cubic Tech, now acquired by DSM Dyneema, known as CT155 UHMWPE. This laminate utilizes ultra-high molecular weight polyethylene fibers to strengthen the membrane. This material's specific modulus is approximately $9.52*10^7$ m²/s² and specific yield strength is $1.43*10^6$ m²/s² for a 0.4 mm thick segment. Of course, other materials can be used for the membrane as long as they approximate or exceed the specific properties of CT155 UHMWPE.

Figure 5A:
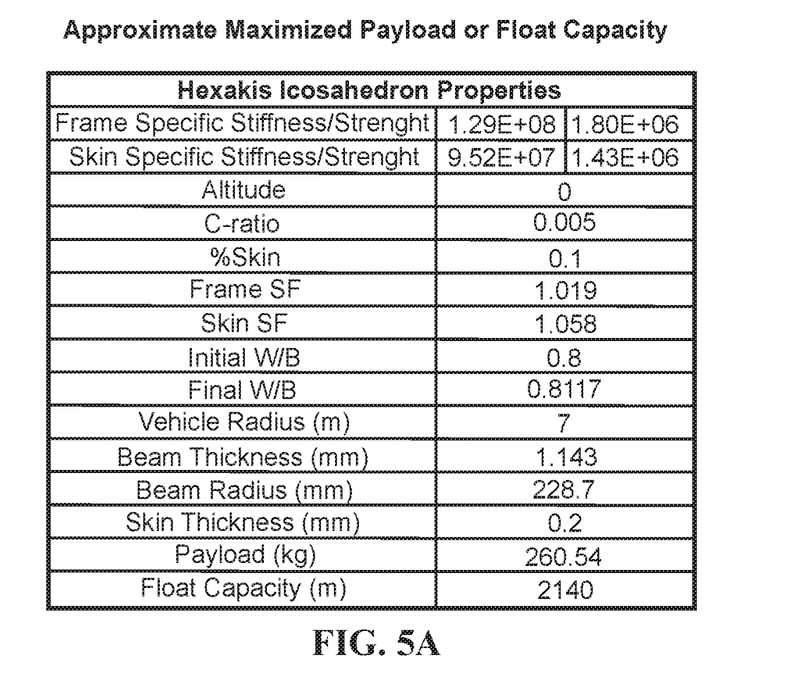
FIGS. 5A and 5B are tables presenting hexakis icosahedron properties of an approximate maximized payload or float capacity for embodiments of a VLTAV of the present invention.
Figure 5B:
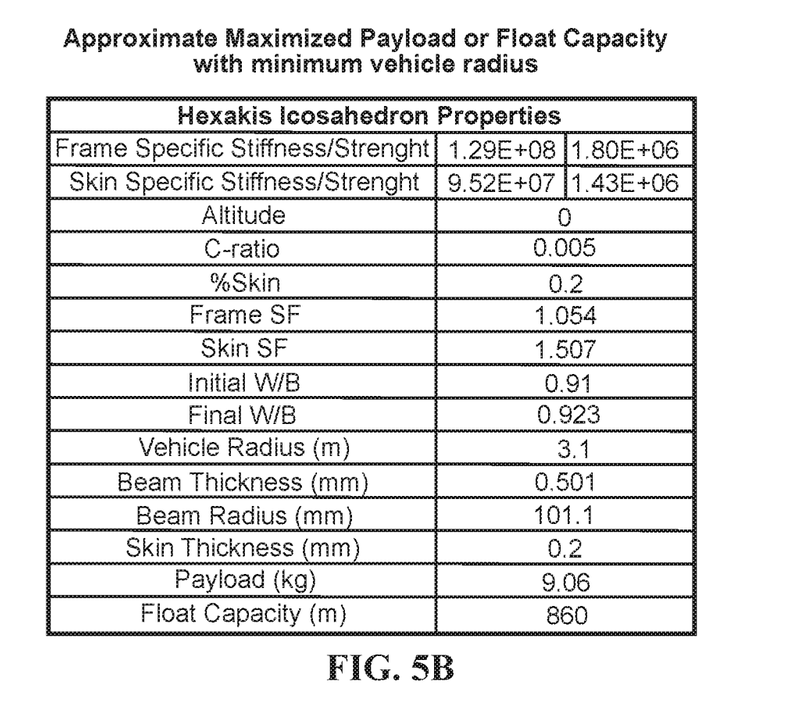

These materials were used to preliminarily analyze several example design iterations for manufacturing feasibility. Two designs, one with payload or float capacity maximized, and the other with the radius of the vehicle minimized are detailed as examples of feasible structure that could be realized with the existing materials described above. Both designs total W/B were decreased until the safety factor SF constraint was reached for either the frame or skin. The results of the two feasible vehicles are shown in the Tables of FIGS. 5A and 5B. The design (FIG. 5A) focusing on maximizing payload would have a vehicle diameter of 14 m (46 ft) and could carry a payload of 260 kg or float to 2140 m. This vehicle was able to attain a final W/B of 0.8 limited by the frame SF before the skin. The design (FIG. 5B) focusing on minimized radius had a vehicle diameter of 6.2 m (20 ft) and could carry a payload of 9 kg or float to 860 m. This design's final W/B was 0.91.

So, the rods 11 and membrane skin 12 have weights and dimensions that result in a neutral and/or positive buoyancy for the vessel while preventing geometric instability. A concern with vacuum airships is that the required vacuum or near-vacuum inside the structure results in the atmospheric pressure exerting enormous forces, causing the structure to collapse if not supported. The structure of the present embodiments solves the problem using geometry and materials, in combination, that resist buckling at pressures needed to produce neutral and/or positive buoyancy.

Various contemplated and example embodiments of a VLTAV aircraft could be used and retrofitted for propulsion, aerodynamics, energy renewal, sensors and endurance etc.

Figure 6:
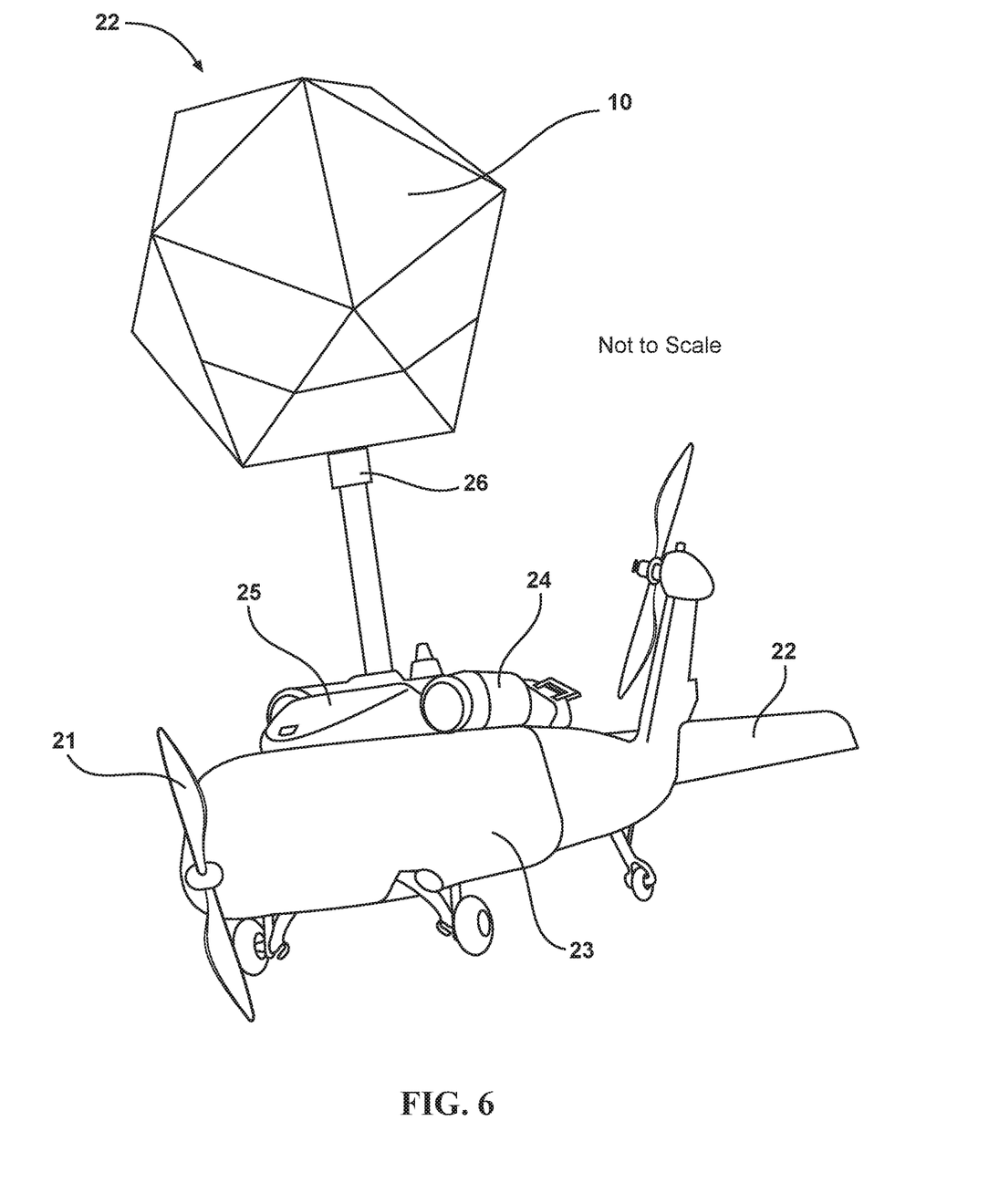
FIG. 6 is a perspective view illustrating an embodiment of a low-altitude VLTAV in accordance with features of the present invention.

Referring now to FIG. 6, an example embodiment of an operational low-altitude VLTAV aircraft 20 for urban surveillance is shown. This aircraft 20 may either operate inside of buildings or outside of buildings without exceeding the aerodynamic coverage that the buildings provide. The aircraft 20 includes the frame/membrane structure of the VLTAV 10 discussed above, along with a vacuum port 26 included such that a vacuum pump 25 could be carried to vary the vacuum level or altitude of the vehicle 20 when desired. The vehicle 20 may also have a propeller 21, control surfaces 22, batteries 23 as a power source for the pump 25 and an electric turbine 24 for propulsion via the associated propeller 21. The turbine 24 may have a dual use to charge the batteries 23 using wind. For example, the vehicle 20 may launch a tether to secure itself to a building and then use wind to turn the turbine 24 and thus recharge the batteries 23 of the vehicle 20 when necessary so that the vehicle could have increased endurance and mobility. The turbine 24 may also rotate 360 degrees to allow for maneuverability and to position itself with wind gusts for recharging.

Figure 7:
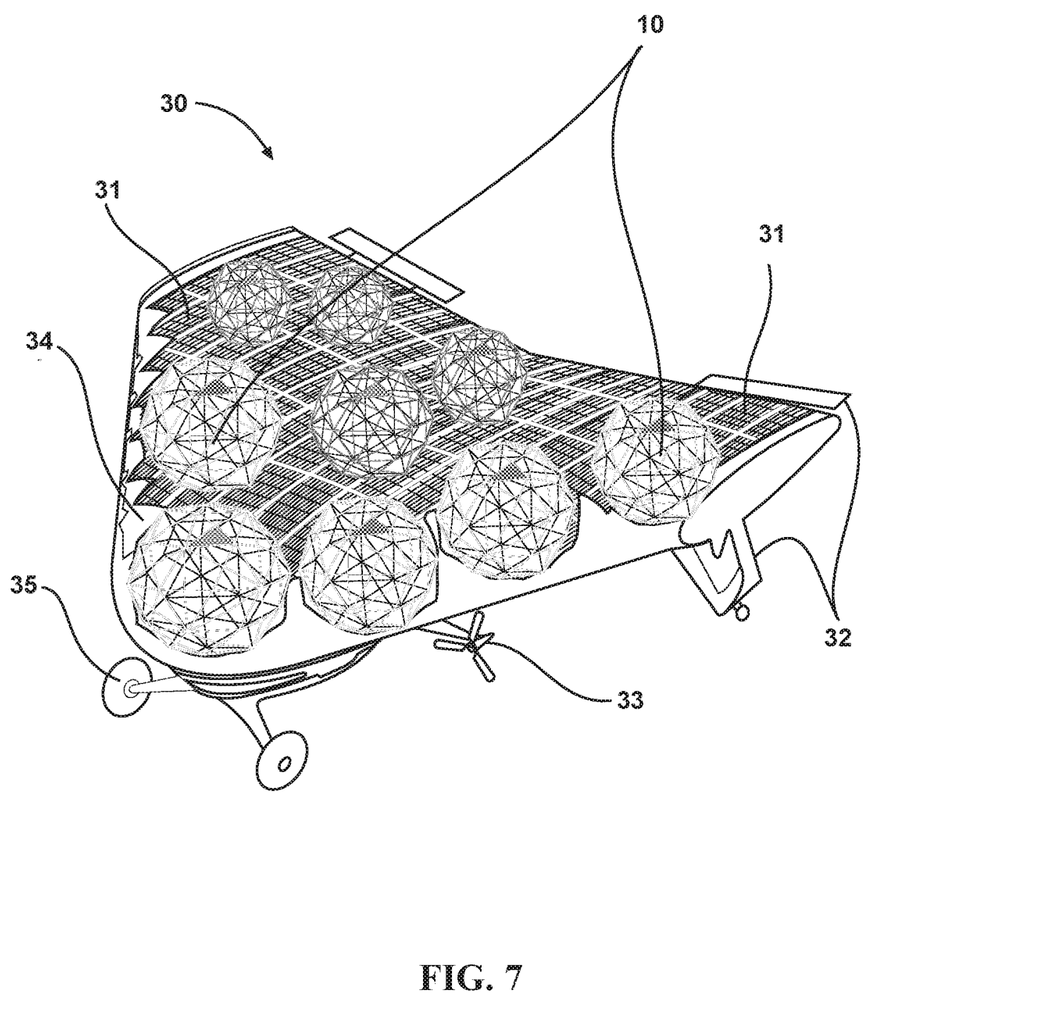
FIG. 7 is a perspective view illustrating an embodiment of a mid-altitude VLTAV in accordance with features of the present invention.

An example embodiment of a mid-altitude aircraft 30 is shown in FIG. 7. This aircraft 30 may use multiple internal VLTAVs 10 as discussed above within an aerodynamic shroud 34 to attain "lift" for the aircraft 30. The shroud 34 may be fitted with solar panels 31, control surfaces 32 and a propulsion system 33 to allow the vehicle 30 to be controlled as a modern aircraft would. Landing gear 35 may also be provided. This vehicle 30 would be able to fly at extremely low speeds because the effect of stall would not be an issue because the flight mechanism of the vehicle utilizes the buoyancy developed from the vacuum LTAV's 10. It will be appreciated, however, that in other embodiments, lift can be provided by a combination of the air speed and wing design as well as the use of multiple internal VLTAVs. In other embodiments, altitude control could be performed by having inflatable and deflate-able ballast (not shown) for which air could be pumped in or out. The array of solar panels 31 on top of the shroud 34 would be used for energy regeneration so that the vehicle may have extremely long endurance.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

That which is claimed is:

1. A vacuum lighter than air vehicle (VLTAV) comprising:
a plurality of rods connected together to form a hexakis icosahedron rigid frame; and
a membrane skin covering the rigid frame and defining therewith a vessel configured to hold an internal vacuum that allows the vessel to float in the air;
wherein materials of the rods and membrane skin result in the vessel having a weight and buoyant force that results in positive buoyancy while preventing geometric instability;
wherein the rods comprise a carbon fiber composite material having a specific modulus of at least approximately $1.29*108$ m2/s2 and a specific yield strength of at least approximately $1.80*106$ m2/s2 as a zero-degree layup;
wherein the rods of the rigid frame are connected together at 62 vertices with 180 edges defining 120 about equal size scalene triangle faces;
wherein the membrane skin comprises a fiber matrix reinforced laminate membrane skin material having a specific modulus of at least approximately $9.52*107$ m2/s2 and specific yield strength of at least approximately $1.43*106$ m2/s2 for a 0.4 mm thick segment; and
wherein the rigid frame comprises joint members connecting the rods at vertices.

2. A vacuum lighter than air vehicle (VLTAV) comprising:
a plurality of rods connected together by a plurality of joint members to form a hexakis icosahedron rigid frame, the rods connected together at 62 vertices with 180 edges defining 120 about equal size scalene triangle faces; and
a laminate membrane skin covering the rigid frame and defining therewith a vessel configured to hold an internal vacuum that allows the vessel to float in the air;
wherein materials of the rods and membrane skin result in a positive buoyancy for the vessel while preventing geometric instability;
wherein the rods comprise a material having a specific modulus of at least approximately $1.29*10^8$ m$^2$/s$^2$ and a specific yield strength of at least approximately $1.80*10^6$ m$^2$/s$^2$ as a zero-degree layup; and wherein the laminate membrane comprises a material having a specific modulus of at least approximately $9.52*10^7$ m$^2$/s$^2$ and specific yield strength of at least approximately $1.43*10^6$ m$^2$/s$^2$ for a 0.4 mm thick segment.

3. A method of making a vacuum lighter than air vehicle (VLTAV), the method comprising:

constructing a rigid frame by connecting a plurality of rods together to form a hexakis icosahedron; and covering the rigid frame with a membrane skin to define a vessel configured to hold an internal vacuum that allows the vessel to float in the air selecting weights and dimensions of the rods and membrane skin to result in one of a neutral buoyancy and a positive buoyancy for the vessel while preventing geometric instability;

wherein the rods comprise a material having a specific modulus of at least approximately $1.29*108$ m2/s2 and a specific yield strength of at least approximately $1.80*106$ m2/s2 as a zero-degree layup;

wherein the rods of the rigid frame are connected together at 62 vertices with 180 edges defining 120 about equal size scalene triangle faces;

wherein the membrane skin comprises a material having a specific modulus of at least approximately $9.52*107$ m2/s2 and specific yield strength of at least approximately $1.43*106$ m2/s2 for a 0.4 mm thick segment; and wherein the rigid frame comprises joint members connecting the rods at vertices.

\* \* \* \* \*